United States Patent
Deguchi et al.

(10) Patent No.: US 10,483,897 B2
(45) Date of Patent: Nov. 19, 2019

(54) SWITCHED RELUCTANCE MOTOR SYSTEM, AND METHOD OF CONTROLLING SWITCHED RELUCTANCE MOTOR SYSTEM

(71) Applicants: TOYOTA JIDOSHA KABUSHIKI KAISHA, Toyota-shi (JP); Tokyo University of Science Foundation, Shinjuku-ku (JP)

(72) Inventors: Junichi Deguchi, Susono (JP); Takahiro Shiina, Numazu (JP); Kensuke Yoshizue, Susono (JP); Nobukazu Hoshi, Shinjuku-ku (JP); Yusuke Kobayashi, Shinjuku-ku (JP); Yosuke Murakami, Shinjuku-ku (JP); Tomoya Abe, Shinjuku-ku (JP)

(73) Assignees: TOYOTA JIDOSHA KABUSHII KAISHA, Toyota-shi (JP); Tokyo University of Science Foundation, Shinjuku-ku (JP)

( * ) Notice: Subject to any disclaimer, the term of this patent is extended or adjusted under 35 U.S.C. 154(b) by 0 days.

(21) Appl. No.: 15/957,273

(22) Filed: Apr. 19, 2018

(65) Prior Publication Data
US 2018/0309401 A1   Oct. 25, 2018

(30) Foreign Application Priority Data
Apr. 21, 2017 (JP) .................. 2017-084617

(51) Int. Cl.
*H02P 25/08* (2016.01)
*H02P 25/098* (2016.01)
*H02P 25/086* (2016.01)

(52) U.S. Cl.
CPC .......... *H02P 25/098* (2016.02); *H02P 25/086* (2013.01)

(58) Field of Classification Search
CPC ........................ H02P 25/086; H02P 25/098
(Continued)

(56) References Cited

U.S. PATENT DOCUMENTS 6,081,083 A * 6/2000 Nashiki ............... H02K 19/103
318/254.2
6,150,778 A * 11/2000 Morris ................. H02P 25/089
318/254.1
(Continued)

FOREIGN PATENT DOCUMENTS

| JP | 2006-296120 A | 10/2006 |
| JP | 2010-252452 A | 11/2010 |
| JP | 2013-240200 | 11/2013 |

OTHER PUBLICATIONS

Takeno, M. et al. "Improvement of torque characteristic of a 50kW SRM for HEV with a consideration of magnetic saturation of stator yoke," The Japan Society of Applied Electromagnetics and Mechanics (JSAEM), vol. 19, No. 2, Jun. 2011, pp. 6.

*Primary Examiner* — Bickey Dhakal
*Assistant Examiner* — Gabriel Agared
(74) *Attorney, Agent, or Firm* — Oblon, McClelland, Maier & Neustadt, L.L.P.

(57) ABSTRACT

A switched reluctance motor system includes a switched reluctance motor, a rotor including a plurality of salient poles, a stator including a plurality of salient poles, coils of three phases wound around the salient poles of the stator, and an electronic control unit. The electronic control unit is configured to drive the switched reluctance motor in a pole configuration pattern of NSNSNS in which the salient poles of the stator that have different polarities are alternately arranged. The electronic control unit is configured to perform current waveform control when an excitation sound
(Continued)

frequency of a given order coincides with a resonance frequency of the switched reluctance motor.

8 Claims, 10 Drawing Sheets

(58) Field of Classification Search
USPC .................................................. 318/254.1
See application file for complete search history.

(56) References Cited

U.S. PATENT DOCUMENTS

| | | | |
|---|---|---|---|
| 6,369,481 B1* | 4/2002 | Bahn | H02K 19/103 310/166 |
| 2008/0197793 A1* | 8/2008 | Randall | H02P 25/092 318/254.1 |
| 2010/0123426 A1* | 5/2010 | Nashiki | H02K 1/12 318/701 |
| 2012/0091940 A1* | 4/2012 | Nashiki | H02K 19/103 318/701 |
| 2012/0169267 A1* | 7/2012 | Nashiki | H02K 19/103 318/701 |
| 2012/0293031 A1* | 11/2012 | Atkins | H02K 49/102 310/104 |
| 2013/0342039 A1* | 12/2013 | Umemori | H02K 29/03 310/49.43 |
| 2013/0342040 A1* | 12/2013 | Umemori | H02K 37/04 310/49.43 |
| 2015/0236633 A1* | 8/2015 | Torrey | H02P 25/098 318/254.1 |

* cited by examiner

SWITCHED RELUCTANCE MOTOR SYSTEM, AND METHOD OF CONTROLLING SWITCHED RELUCTANCE MOTOR SYSTEM

INCORPORATION BY REFERENCE

The disclosure of Japanese Patent Application No. 2017-084617 filed on Apr. 21, 2017 including the specification, drawings and abstract is incorporated herein by reference in its entirety.

BACKGROUND

1. Technical Field

The disclosure relates to a switched reluctance motor system, and a method of controlling the switched reluctance motor system.

2. Description of Related Art

A switched reluctance motor including a stator and a rotor each having a plurality of salient poles, and coils wound around the salient poles of the stator, is known. In the switched reluctance motor, the salient poles of the stator are opposed to those of the rotor, and the rotor is rotated with magnetic attractive force generated between the salient poles of the stator and those of the rotor.

In a technical article titled "Improvement of torque characteristic of a 50 kW SRM for HEV with a consideration of magnetic saturation of stator yoke", The Japan Society of Applied Electromagnetics and Mechanics (JSAEM), June 2011, Vol. 19, No. 2, the results of comparison of torque characteristics between two winding patterns (NNNSSS windings and NSNNSN windings), with regard to a switched reluctance motor, are disclosed. In this technical article, it is stated that, since magnetic saturation is less likely to occur in the NSNNSN windings, than in the NNNSSS windings, the maximum torque of the NSNNSN windings is larger than that of the NNNSSS windings.

SUMMARY

In the "Improvement of torque characteristic of a 50 kW SRM for HEV with a consideration of magnetic saturation of stator yoke", JSAEM, June 2011, Vol. 19, No. 2, it is suggested that, if the NSNNSN windings are employed, the maximum torque of the switched reluctance motor is improved. However, the torque efficiency (which will be simply referred to as "efficiency") of the NNNSSS windings and the NSNNSN windings varies depending on a load condition of the switched reluctance motor. Therefore, the efficiency may be deteriorated if the NSNNSN windings are employed only in view of improvement of the maximum torque.

Further, with regard to the switched reluctance motor, it is desired to take account of vibration and noise, as well as the efficiency.

This disclosure makes it possible to reduce vibration and noise, without deteriorating the efficiency of a switched reluctance motor.

A first aspect of the disclosure is concerned with a switched reluctance motor system. The switched reluctance motor system includes a switched reluctance motor, a rotor including a plurality of salient poles, a stator including a plurality of salient poles, coils of three phases wound around the salient poles of the stator, and an electronic control unit. The electronic control unit is configured to drive the switched reluctance motor in a pole configuration pattern of NSNSNS in which the salient poles of the stator (10) that have different polarities are alternately arranged. The electronic control unit is configured to perform current waveform control when an excitation sound frequency of a given order coincides with a resonance frequency of the switched reluctance motor. The given order is at least one of an order that is a least common multiple of the number of the salient poles of the stator and the number of salient poles of the rotor, and an order that is an integral multiple of a product of the number of the salient poles of the rotor and the number of phases of the coils. The current waveform control is a control that controls current waveforms produced when current is passed through the coils of the three phases, such that a current waveform in the coils of at least one phase has a different shape from a current waveform in the coils of another phase.

With the above configuration, the electronic control unit controls the coils of the three phases such that the current waveform of at least one phase, out of the current waveforms of the three phases, has a different shape from the current waveform(s) of the other phase(s), during driving in the pole configuration pattern of NSNSNS. Therefore, resonance can be reduced when the excitation sound frequency of the order (specific order) that is the least common multiple of the number of poles of the stator and the number of poles of the rotor, or an integral multiple of the product of the number of poles of the rotor and the number of phases of the coil, coincides with the resonance frequency. Thus, it is possible to reduce vibration and noise in the resonance region, while assuring high efficiency.

In the switched reluctance motor system as described above, excitation conditions as conditions under which the current is passed through the coils of the three phases may include an excitation start angle and an excitation end angle. The electronic control unit may be configured to perform a selected one of first excitation control and the current waveform control. The first excitation control may be control that controls excitation of the coils such that the current waveforms in the coils of the three phases have the same shape, according to a drive state of the switched reluctance motor. When the electronic control unit performs the current waveform control, at least one of a condition (i) and a condition (ii) below may be satisfied, in the above-indicated at least one phase of which the current waveform has a different shape from that of the other phase; (i) the excitation start angle is shifted from the excitation start angle of the same phase used under the first excitation control, and (ii) the excitation end angle is shifted from the excitation end angle of the same phase used under the first excitation control.

With the above configuration, at least one of the excitation start angle and the excitation end angle included in the excitation conditions is changed, so as to realize current waveforms that can reduce vibration and noise. Therefore, the cost can be reduced, as compared with the case where a switching circuit is added to an inverter, so as to enable switching to a pole configuration pattern that can reduce vibration and noise.

In the switched reluctance motor system as described above, the electronic control unit may be configured to perform excitation condition setting control. The excitation condition setting control may be a control that select and set a first shift amount and a second shift amount from within a given angular range. The first shift amount may be a shift amount by which the excitation start angle used under the current waveform control is shifted from the excitation start angle of the same phase used under the first excitation control, and the second shift amount may be a shift amount by which the excitation end angle used under the current waveform control is shifted from the excitation end angle of the same phase used under the first excitation control.

With the above configuration, the shift amount regarding the excitation start angle and the shift amount regarding the excitation end angle can be selected from within the given angular range. Namely, the angle set as the shift amount is a variable value. As a result, the frequency component of a specific order can be dispersed more widely as compared with the case where the shift amount is a fixed value, and vibration and noise can be reduced.

In the switched reluctance motor system as described above, the given angular range may be narrower as the number of the salient poles of the rotor is larger.

With the above configuration, the angular range from which the shift amount can be selected changes according to the number of the poles of the rotor; therefore, the disclosure can be applied to a wider range of switched reluctance motors. Also, since the angular range changes according to the number of the poles of the rotor, the excitation start angle and the excitation end angle are prevented from being shifted to angles at which the efficiency deteriorates.

In the switched reluctance motor system as described above, the electronic control unit may be configured to set the first shift amount and the second shift amount to different values when both the excitation start angle and the excitation end angle of the at least one phase are shifted from those of the excitation conditions of the same phase used under the first excitation control.

With the above configuration, since the shift amount regarding the excitation start angle and the shift amount regarding the excitation end angle can be set to different values, the current waveforms having various shapes can be realized. Thus, during driving in the pole configuration pattern of NSNSNS, the current waveforms of the three phases become more unbalanced as a whole, and the frequency component of a specific order can be dispersed, so that vibration and noise can be reduced.

In the switched reluctance motor system as described above, the current waveform control may include second excitation control for controlling the coils into a two-phase excited state in which current waveforms of adjacent two phases intersect with each other.

With the above configuration, the excitation zones of adjacent phases overlap each other in the two-phase excitation state; therefore, the rate of change of the current value is reduced, and the amplitude of the vibratory force (radial force) can be reduced. Thus, it is possible to further reduce the vibratory force at the specific order, while assuring high efficiency.

The control system for the switched reluctance motor as described above may further include a switching circuit configured to switch a winding pattern of the coils of the three phases between a first winding pattern and a second winding pattern. The first winding pattern may be a pole configuration pattern of NNNSSS in which the coils of the three phases are wound in the same direction. The second winding pattern may be the pole configuration pattern of NSNSNS.

With the above configuration, the winding pattern can be switched according to the drive region, to the optimum winding pattern having a high efficiency in this drive region, and the vibration and noise of the specific order can be reduced, during driving in the pole configuration pattern of NSNSNS.

A second aspect of the disclosure is concerned with a method of controlling a switched reluctance motor system. The switched reluctance motor system includes a rotor including a plurality of salient poles, a stator including a plurality of salient poles, coils of three phases wound around the salient poles of the stator, and an electronic control unit configured to drive the switched reluctance motor in a pole configuration pattern of NSNSNS in which the salient poles of the stator (10) that have different polarities are alternately arranged. The method includes performing, by the electronic control unit (100), current waveform control when an excitation sound frequency of a given order coincides with a resonance frequency of the switched reluctance motor. The given order is at least one of an order that is a least common multiple of the number of the salient poles of the stator and the number of salient poles of the rotor, and an order that is an integral multiple of a product of the number of the salient poles of the rotor and the number of phases of the coils. The current waveform control is a control that controls current waveforms produced when current is passed through the coils of the three phases, such that a current waveform in the coils of at least one phase has a different shape from a current waveform in the coils of another phase.

With the above configuration, the electronic control unit controls the coils of the three phases such that the current waveform of at least one phase, out of the current waveforms of the three phases, has a different shape from the current waveform(s) of the other phase(s), during driving in the pole configuration pattern of NSNSNS. Therefore, resonance can be reduced when the excitation sound frequency of the order (specific order) that is the least common multiple of the number of poles of the stator and the number of poles of the rotor, or an integral multiple of the product of the number of poles of the rotor and the number of phases of the coil, coincides with the resonance frequency. Thus, it is possible to reduce vibration and noise in the resonance region, while assuring high efficiency.

With the disclosure, it is possible to reduce vibration and noise, without deteriorating the efficiency of the switched reluctance motor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
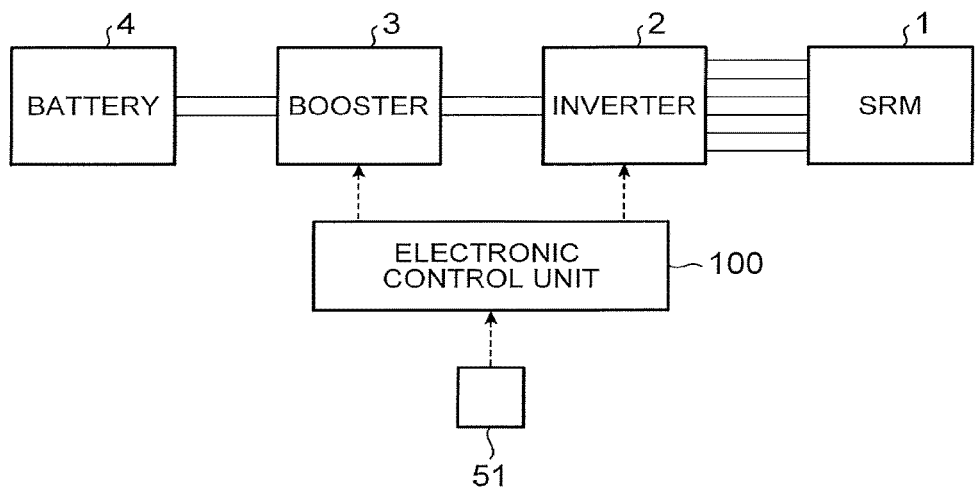
FIG. 1 is a view schematically showing the system configuration of a first embodiment.

Referring to the drawings, control systems of switched reluctance motors according to some embodiments of the disclosure will be specifically described.

FIG. 1 schematically shows the system configuration of a first embodiment. As shown in FIG. 1, the system configuration of the first embodiment includes a switched reluctance motor (which will be called "SR motor") 1, inverter 2, booster or step-up transformer 3, battery 4, and an electronic control unit (ECU) 100. A control system of the SR motor 1 includes at least the inverter 2 and the electronic control unit 100. In the following description, the "control system of the SR motor 1" will be simply referred to as "control system".

The SR motor (SRM) 1 is electrically connected to the battery 4 via the inverter 2 and the booster 3. The SR motor 1 and the inverter 2 are electrically connected via coils 12 of three phases (see FIG. 2). The SR motor 1 is an electric motor that does not use permanent magnets in its rotor, and is driven with excitation current flowing through the coils 12 of the three phases. The SR motor 1 functions not only as the electric motor, but also as a generator.

Figure 2:
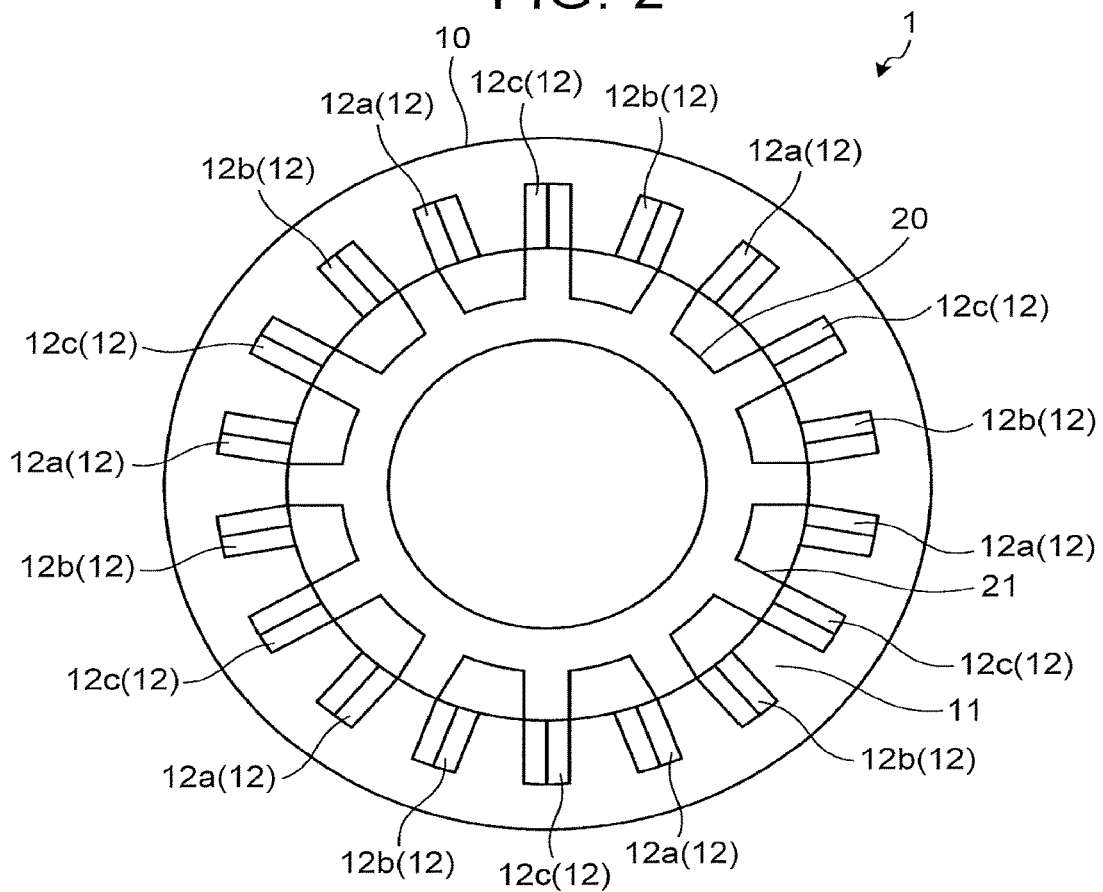
FIG. 2 is a view schematically showing a constructive example of a switched reluctance motor according to the first embodiment.

As shown in FIG. 2, the SR motor 1 is a three-phase motor including a stator 10 having a salient-pole structure, and a rotor 20 having a salient-pole structure. The stator 10 has a plurality of stator teeth 11 as salient poles, on an inner circumferential portion of its annular structure. A coil 12 connected to the inverter 2 is wound around each of the stator teeth 11. The rotor 20 rotates as a unit with a rotor shaft (not shown), and is located radially inward of the stator 10. The rotor 20 has a plurality of rotor teeth 21 as salient poles, on an outer circumferential portion of its annular structure.

The three-phase SR motor 1 includes phase A (phase U) composed of a pair of stator teeth 11 and coils 12a, phase B (phase V) composed of a pair of stator teeth 11 and coils 12b, and phase C (phase W) composed of a pair of stator teeth 11 and coils 12c.

The inverter 2 is constituted by an electric circuit (inverter circuit) including a plurality of switching devices that cause three-phase currents to pass through the coils 12. Namely, the inverter 2 causes electric current to flow through each of the coils 12 of each phase connected to the inverter circuit.

The booster 3 is provided between the inverter 2 and the battery 4, and serves to boost or raise voltage applied to the SR motor 1. The booster 3 is constituted by a boost converter, for example. It is, however, to be noted that the booster 3 is not essential to the system configuration, and thus may not be provided.

The electronic control unit 100 performs drive control on the SR motor 1. The electronic control unit 100 includes CPU, storage unit that stores data of various programs, etc., and a computing unit that performs various computations so as to perform drive control on the SR motor 1. Also, the electronic control unit 100 receives a resolver signal from a rotational speed sensor 51 that detects the rotational speed of the SR motor 1. The computing unit performs computations for motor control; for example, it computes the rotational speed of the SR motor 1 (which will be called "motor speed") based on the above-indicated resolver signal. Then, as a result of computations performed by the computing unit, the electronic control unit 100 outputs a command signal for controlling the inverter 2, to the inverter 2.

For example, the electronic control unit 100 performs control to repeat switching of the coils 12 to which current is to be applied, from one phase to another, based on the relative positions or positional relationship between the stator teeth 11 and the rotor teeth 21 in the rotational direction, from the resolver signal. In this control, the electronic control unit 100 causes excitation current to flow through the coils 12 of a certain phase to excite the corresponding stator teeth 11, so that magnetic attractive force is generated between the stator teeth 11, and the rotor teeth 21 close to the stator teeth 11, whereby the rotor 20 is rotated. Thus, the electronic control unit 100 controls the inverter 2, thereby to control the voltage and excitation current applied to the SR motor 1.

Figure 3:
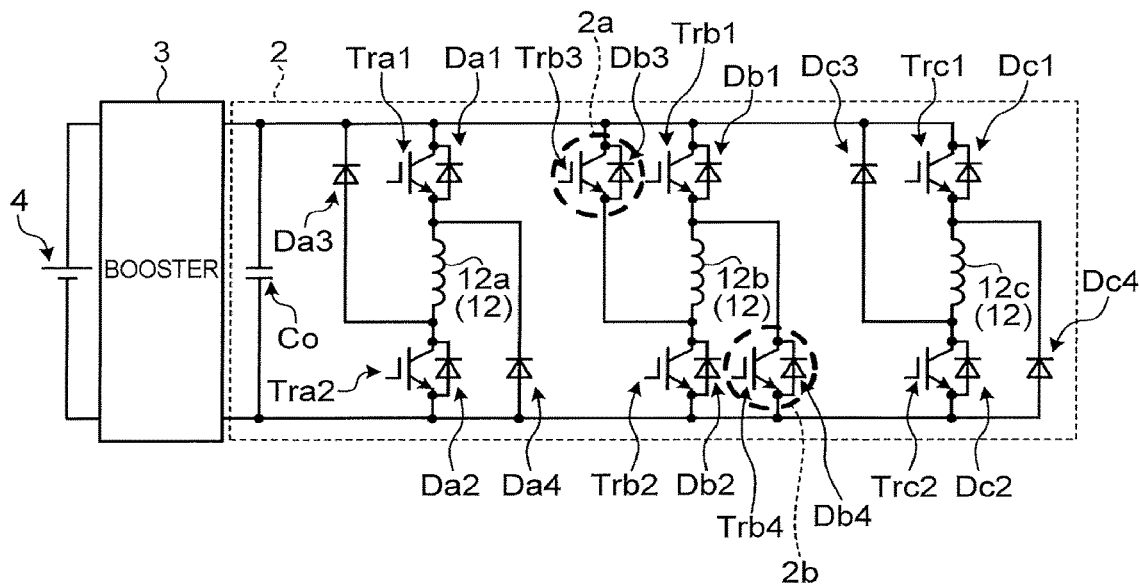
FIG. 3 is a circuit diagram showing an example of an inverter circuit of the first embodiment.

The control system can switch the pole configuration pattern of the SR motor 1 between two patterns, i.e., "NNNSSS" and "NSNSNS", by switching ON/OFF of changeover switches included in a switching circuit of the inverter 2, during driving of the SR motor 1. As shown in FIG. 3, the inverter 2 includes the switching circuit for switching the pole configuration pattern (winding pattern). In FIG. 3, potions circled with broken lines indicate changeover switches (switching units) for switching the pole configuration pattern.

As shown in FIG. 3, the inverter circuit that constitutes the inverter 2 includes one capacitor Co, and two or more diodes and transistors provided for each phase. The switching circuit is included in a phase B (phase V) circuit as a part of the inverter circuit. In the inverter 2, the respective transistors for each phase are simultaneously turned on or off, or one of the transistors is turned on, and the other transistor is turned on or off, so that a value of current flowing through the coils 12 is changed. A smoothing capacitor may be provided in place of the capacitor Co.

More specifically, the inverter 2 includes four transistors Trb1, Trb2, Trb3, Trb4, and four diodes Db1, Db2, Db3, Db4, in the phase B circuit. The transistor Trb3 and the diode Db3 constitute a switching unit 2a for switching of the pole configuration pattern, and the transistor Trb4 and the diode Db4 constitute a switching unit 2b for switching of the pole configuration pattern. Also, the inverter 2 includes two transistors Tra1, Tra2, and four diodes Da1, Da2, Da3, Da4, in the phase A circuit. Further, the inverter 2 includes two transistors Trc1, Trc2, and four diodes Dc1, Dc2, Dc3, Dc4, in the phase C circuit.

By turning off the transistors Trb3, Trb4, and using the transistors Trb1, Trb2 for control of current in the coils 12b, in the phase B circuit, it is possible to realize a pole configuration pattern (NNNSSS windings) in which adjacent magnetic poles of phase A, phase B and phase C in the SR motor 1 have the same polarity. Also, by turning off the transistors Trb1, Trb2, and using the transistors Trb3, Trb4 for control of current in the coils 12b, in the phase B circuit, it is possible to realize a pole configuration pattern (NSN-SNS windings) in which only the magnetic pole of phase B, out of adjacent magnetic poles of phase A, phase B, and phase C in the SR motor 1, has the opposite polarity. Thus, the inverter 2 can switch the winding pattern of the coils 12 between the two winding patterns (NNNSSS windings and NSNSNS windings), by switching ON/OFF of the transistors Trb3, Trb4 as the changeover switches.

Figure 4:
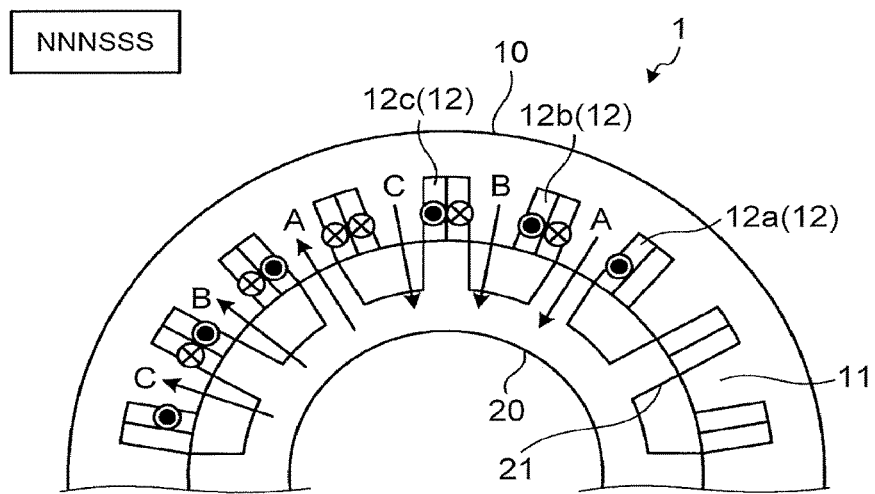
FIG. 4 is a view useful for explaining a pole configuration pattern of NNNSSS.

Referring to FIG. 4, the pole configuration pattern of NNNSSS will be described. When the pole configuration pattern is NNNSSS, the coils 12 of the three phases are wound around the salient poles of the stator 10 so that the three phases are arranged in the order of phase A, phase B, phase C, phase A, phase B, and phase C as viewed from the right-hand side in FIG. 4, and the polarities of these poles are N, N, N, S, S, and S, respectively. Thus, the winding pattern in which the coils 12a, 12b, 12c of the three phases are wound in the same direction will be called "NNNSSS windings".

Figure 5:
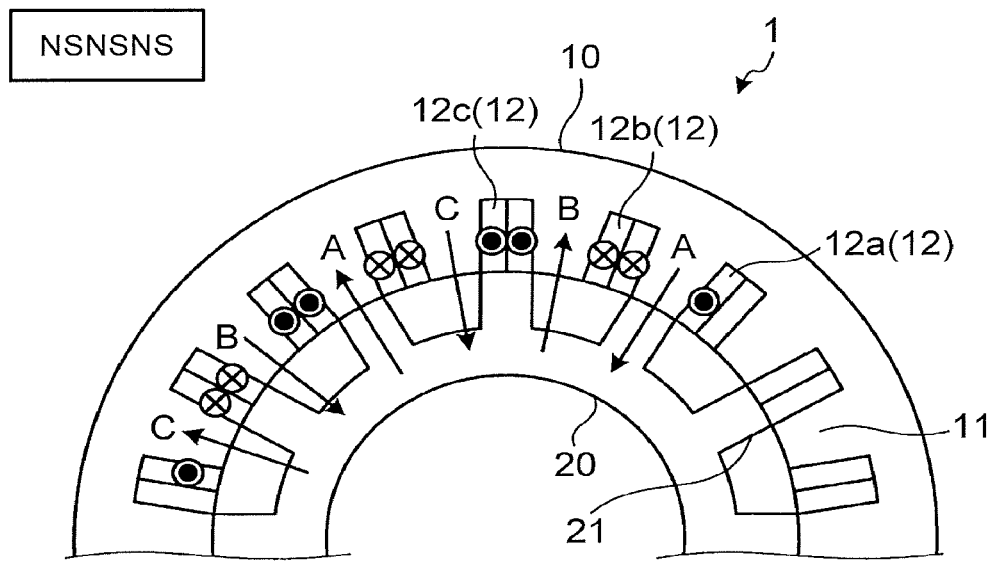
FIG. 5 is a view useful for explaining a pole configuration pattern of NSNSNS.

Referring to FIG. 5, the pole configuration pattern of NSNSNS will be described. When the pole configuration pattern is NSNSNS, the coils 12 of the three phases are wound around the salient poles of the stator 10 so that the three phases are arranged in the order of phase A, phase B, phase C, phase A, phase B, and phase C as viewed from the right-hand side in FIG. 5, and the polarities of these poles are N, S, N, S, N, and S, respectively. Thus, the winding pattern in which the coils 12a, 12b, 12c of the three phases are wound such that the poles having different polarities are alternately arranged in the circumferential direction of the stator 10 will be called "NSNSNS windings".

The "NSNSNS windings" may also refer to a winding pattern in which the coils 12 having different winding directions are alternately arranged in the circumferential direction of the stator 10 such that the winding direction of one stator salient pole (stator tooth 11) is opposite to that of an adjacent stator salient pole (adjacent stator tooth 11). In the NSNSNS windings, the coil 12b is located between the coil 12a and the coil 12c in the circumferential direction of the stator 10, and the coils 12a, 12c, out of the coils 12a, 12b, 12c of the three phases, are wound in the same direction, while the coil 12b is wound in the opposite direction.

The control system performs control for switching between a first winding pattern (NNNSSS windings) that provides "pole configuration pattern of NNNSSS", and a second winding pattern (NSNSNS windings) that provides "pole configuration pattern of NSNSNS". In the switching control, the control system determines the current drive region of the SR motor 1, using a switching map involving the motor speed and the motor torque, so that the winding pattern can be switched to the one corresponding to the motor speed and the motor torque. The switching map is stored in the storage unit of the electronic control unit 100.

For example, the control system performs control for switching the winding pattern to the NNNSSS windings when the SR motor 1 is driven in a low-speed, low-load drive region, and switching the winding pattern to the NSNSNS windings when the SR motor 1 is driven in a high-speed, high-load drive region. This is because the efficiency of each winding pattern varies according to the drive state (drive region) of the SR motor 1. When the SR motor 1 is driven in the low-speed, low-load (low-torque) drive region, the efficiency of the NNNSSS windings is higher than that of the NSNSNS windings. On the other hand, when the SR motor 1 is driven in the high-speed, high-load (high-torque) drive region, the efficiency of the NSNSNS windings is higher than that of the NNNSSS windings. With the switching control performed in this manner, the winding pattern can be switched to the optimum winding pattern according to the drive region, so as to achieve a high efficiency in this drive region.

Switching of the winding pattern does not mean physical switching of the winding direction of the coils 12, but means switching of the manner of electric connection between the coils 12 and the SR motor 1. In short, switching of the direction of current flowing through the coils 12 will be referred to as "switching of the winding pattern".

In the SR motor 1, each of the stator 10 and the rotor 20 has a plurality of salient poles. Therefore, radial force as a radial component of magnetic attractive force generated between the stator teeth 11 and the rotor teeth 21 is considered as a cause of generation of vibration and noise in the SR motor 1. The vibration and noise in the SR motor 1 are reduced as the radial force (vibratory force) is smaller, or the amplitude of the radial force is smaller.

Further, in the SR motor 1, noise may become large at a specific order. Thus, the control system performs control (noise reduction control) for reducing vibration and noise at the specific order.

Thus, the control system performs current waveform control as the noise reduction control in view of vibration and noise, in addition to the switching control of the winding pattern in view of the efficiency. The current waveform control (noise reduction control) will be described later in detail.

As the specific order at which noise and vibration are to be reduced, an order that is the least common multiple of the number of the stator poles and the number of the rotor poles, or an order that is an integral multiple of the product of the number of the rotor poles and the number of the coil phases, may be used.

The specific order provided by the least common multiple of the number of the stator poles and the number of the rotor poles will be described. In the SR motor 1 shown in FIG. 2, the number of the stator poles is "18", and the number of the rotor poles is "12". Therefore, "36" as the least common multiple of these numbers provides the specific order. Then, noise (excitation sound) of "36th order" as the least common multiple of the numbers of the motor poles (the number of the stator poles and the number of the rotor poles) becomes large. In other words, the noise and vibration can be effectively reduced by reducing 36th-order radial force (36th-order component).

Next, the order provided by the integral multiple of the product of the number of the rotor poles and the number of the coil phases will be described. In the SR motor 1 shown in FIG. 2, the number of the rotor poles is "12", and the number of the coil phases is "3". Therefore, "36" or "72" as an integral multiple of the above product provides the specific order. Then, noise of "36th order" or "72nd order" as a multiple of the number of the rotor poles by the number of the phases (an integral multiple of the product of the number of the rotor poles and the number of the coil phases) becomes large. In other words, the noise and vibration can be effectively reduced by reducing 36th-order or 72nd-order radial force (36th-order component or 72nd-order component). The above-indicated integral multiple is a multiple of the number of the rotor poles by the number of the phases, and means a positive integral multiple. Namely, integral multiples of the product of the number of the rotor poles and the number of the coil phases (multiples of the number of the rotor poles by the number of the phases) do not include "0".

Figure 6:
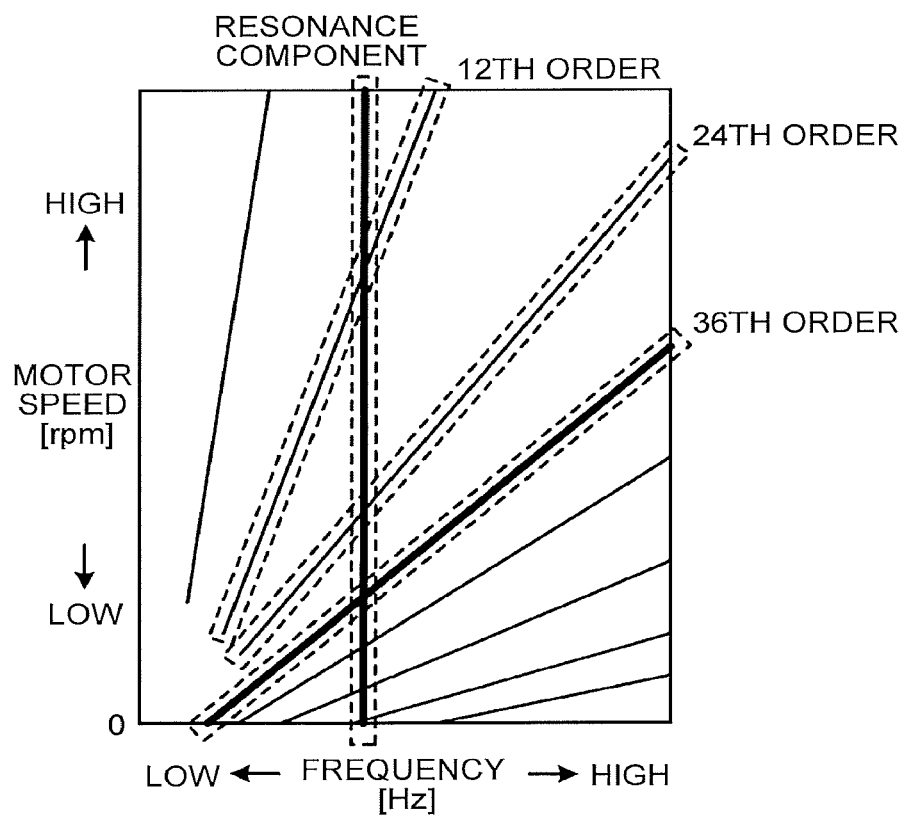
FIG. 6 is a view showing the result of frequency analysis.

As a cause of increase of vibration and noise, resonance at the specific order is considered. Since the motor speed of the SR motor 1 is variable, the excitation sound frequency changes with change of the motor speed. Referring to FIG. 6, resonance that occurs at the specific order will be described. FIG. 6 shows the result of frequency analysis. In the frequency analysis shown in FIG. 6, the same order appears as a positive or upward slope along which the frequency rises in proportion to increase of the motor speed.

As shown in FIG. 6, resonance is more likely to occur as the motor speed changes, and the 36th-order frequency becomes close to the resonance frequency (resonance component). Then, when the 36th-order frequency coincides with the resonance frequency, the largest resonance occurs, and therefore, particularly large vibration and noise are generated. Namely, the sound pressure is increased in a resonance region as a given frequency band including the resonance frequency (natural frequency). Also, the resonance region is included in the drive region (range of usable motor speed) of the SR motor 1. Thus, the control system excites the coils 12 based on excitation conditions different from normal excitation conditions, when resonance at a specific order becomes large, during driving in the pole configuration pattern of NSNSNS. The above-mentioned natural frequency is a natural frequency of a member(s) that constitutes the SR motor 1.

The control system performs control (excitation control) for causing excitation current to flow through the coils 12 of each phase according to excitation conditions, when the coils 12 are excited.

The excitation conditions mean conditions under which the excitation current is passed through the coils 12 of the three phases, when the SR motor 1 is driven. The excitation conditions include at least the excitation start angle and the excitation end angle.

Figure 7:
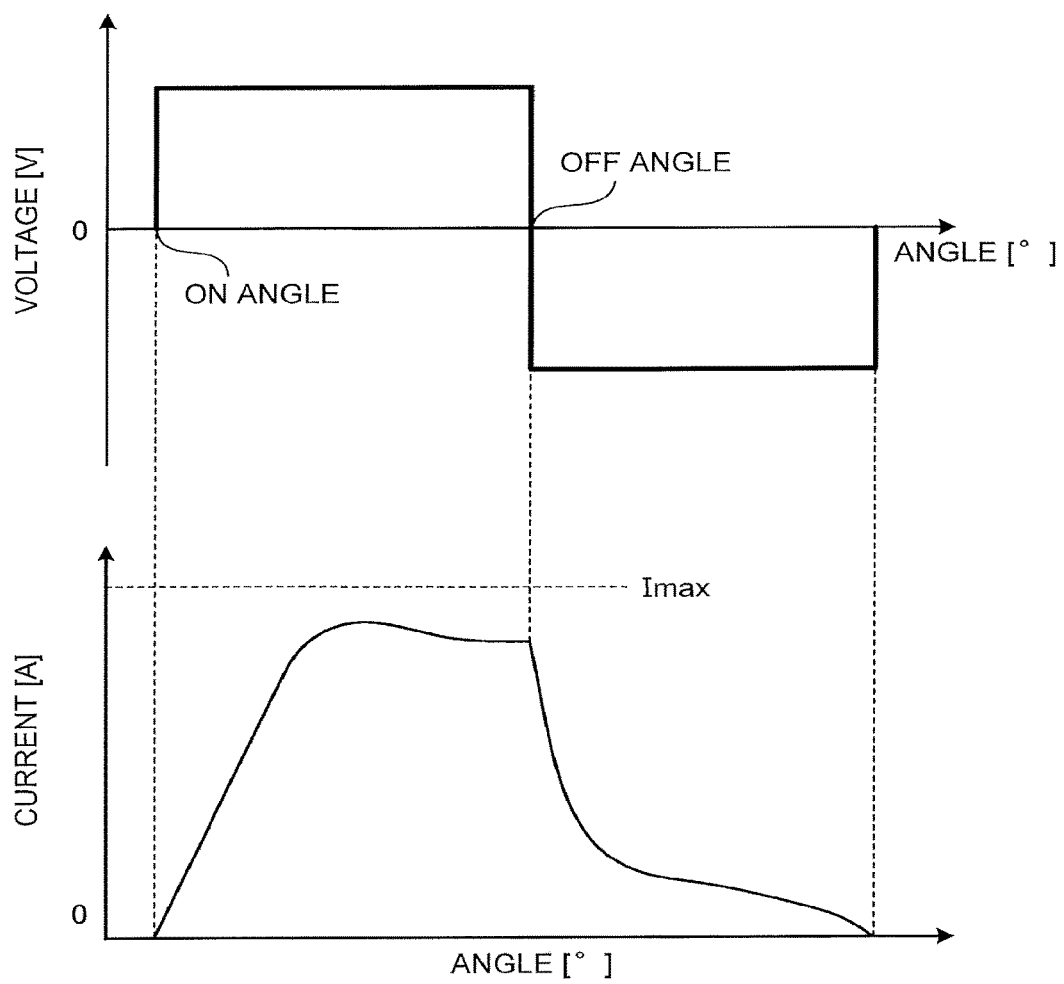
FIG. 7 is a waveform diagram useful for explaining excitation conditions.

As shown in FIG. 7, the excitation start angle (ON angle) is an angle at which a positive voltage starts being applied to the coil 12 to be excited. The excitation end angle (OFF angle) is an angle at which a negative voltage starts being applied to the coil 12 through which current is flowing. Namely, when the rotor rotational angle reaches the excitation start angle, current starts being passed through the coil 12 in question. Then, when the rotor rotational angle reaches the excitation end angle, control for lowering the current value by applying a negative voltage to the coil 12 in question is performed.

The excitation conditions may also include the maximum current value $I_{max}$ and the angle of commutation, in addition to the excitation start angle and the excitation end angle as described above. The maximum current value $I_{max}$ is the upper limit of the current value of the coil 12. The angle of commutation is an angle at which the voltage applied to the coil 12 is equal to "0". At this angle of commutation, control (reflux mode) for refluxing current in the inverter circuit without applying voltage to the coil 12 is started.

Figure 8:
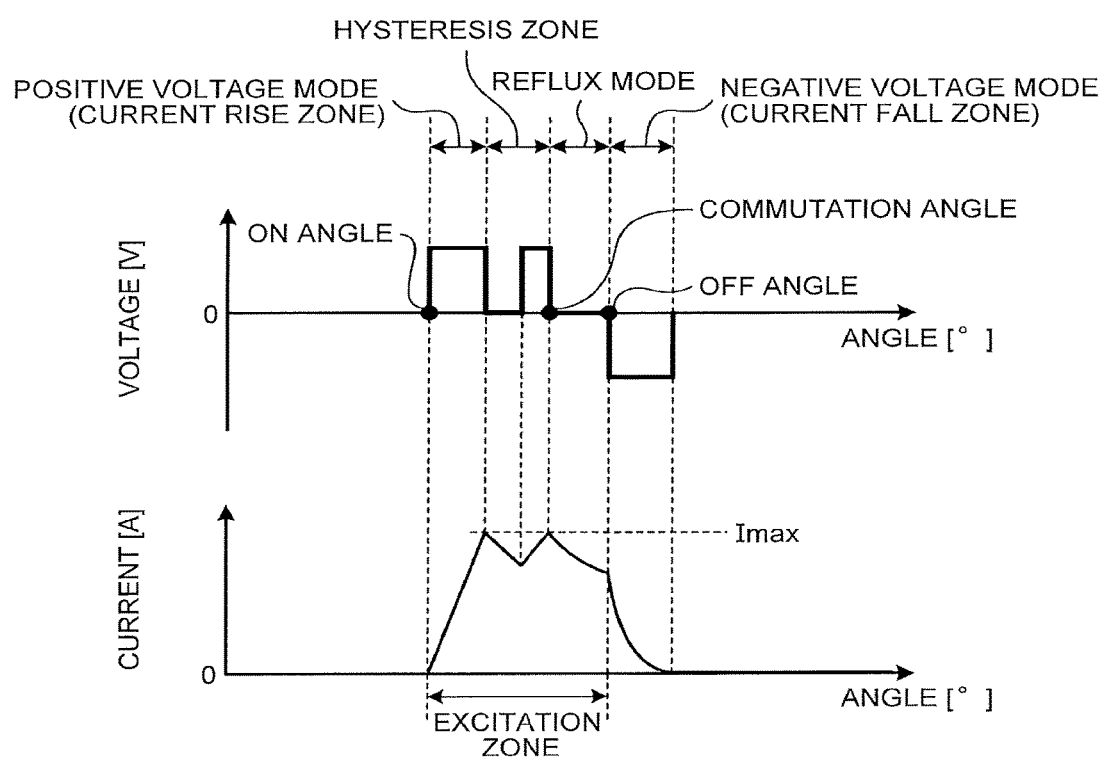
FIG. 8 is a waveform diagram useful for explaining excitation conditions.

As shown in FIG. 7, when the current value does not reach the maximum current value $I_{max}$ as the upper limit while a positive voltage is being applied to the coil 12, a negative voltage starts being applied to the coil 12 when the excitation end angle is reached, after the positive voltage is kept applied (in a positive voltage mode) from the excitation start angle. On the other hand, if the current value reaches the maximum current value $I_{max}$ as the upper limit while a positive voltage is being applied, as shown in FIG. 8, the control system performs hysteresis control. The hysteresis control is control for varying the current value within a given range of current value having the maximum current value $I_{max}$ as upper limit, in a hysteresis zone as a given angular range. Also, when the rotor rotational angle reaches the angle of commutation, the reflux mode is started. Then, if the rotor rotational angle reaches the excitation end angle during the reflux mode, the mode of excitation switches from the reflux mode to a negative voltage mode. An angular range in which the negative voltage mode is carried out will be called "current fall zone". Thus, the hysteresis control using the maximum current value $I_{max}$ and the reflux mode using the angle of commutation may be carried out, between the excitation start angle and the excitation end angle. When the hysteresis control is performed, an angular range in which the positive voltage mode prior to the hysteresis control is carried out is called "current rise zone".

Here, a difference in current waveforms between the winding patterns will be described.

In the NNNSSS windings (first winding pattern), adjacent ones of the phases may have the same polarity or different polarities; therefore, the three phases as a whole are not well-balanced, and an unbalanced current waveform is provided in each phase. Namely, in the pole configuration pattern of NNNSSS, the magnetic flux flows in different ways, and the current rises and falls at different angles, so that the current waveform of each phase becomes unbalanced.

In the NSNSNS windings (second winding pattern), adjacent ones of the magnetic poles have different polarities; therefore, the three phases as a whole are well-balanced, and a uniform current waveform is provided in each phase. Namely, in the pole configuration pattern of NSNSNS, a uniform current waveform is provided in which the maximum current value and the excitation width of each phase are equal. In this connection, the excitation width is an angular range in which the excitation current flows through the coil 12. On the other hand, the excitation zone is an angular range from the excitation start angle to the excitation end angle.

However, in the NSNSNS windings (second winding pattern), since each phase has a uniform current waveform, the order is more likely to be matched. Therefore, vibration and noise (excitation sound) become large at a specific order, such as 36th order. Thus, when the SR motor 1 is driven in the pole configuration pattern of NSNSNS, the control system can use a selected one of normal excitation control for controlling the coils 12 of the three phases to provide current waveforms having the same shape, and current waveform control (noise reduction control) for controlling the coils 12 of the three phases to provide current waveforms having different shapes in different phases, as the excitation control.

Under the normal excitation control, the excitation conditions for each phase are the same conditions, and the coils 12 of the three phases are controlled into an excited state in which the current waveform of each phase has the same shape. For example, the excitation start angle and the excitation end angle are set so that each phase has the same excitation width, and the maximum current value is also set to the same magnitude.

Figure 9:
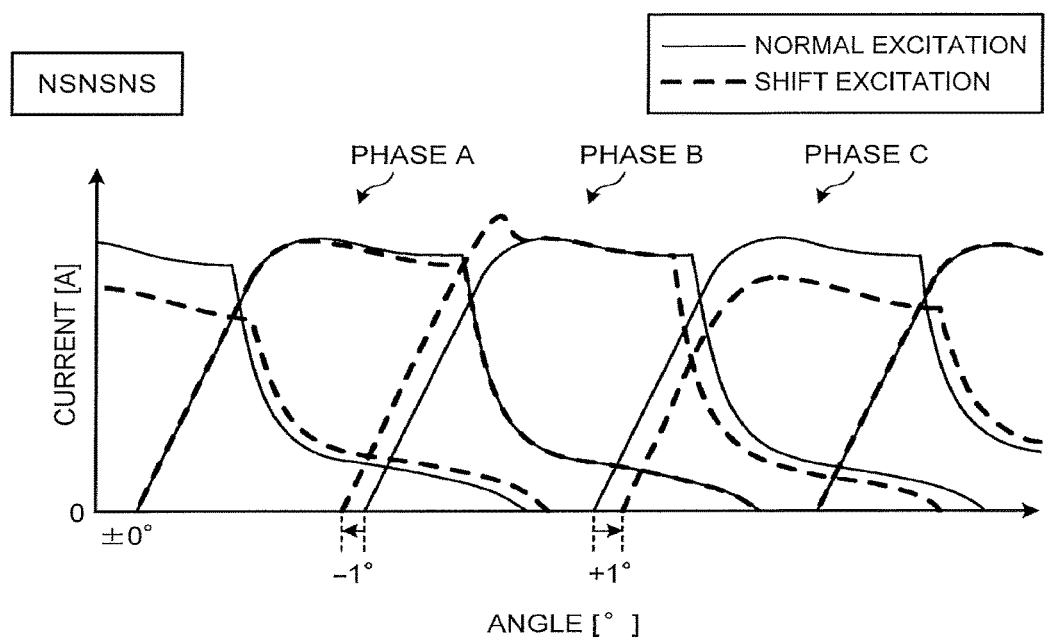
FIG. 9 is a waveform diagram useful for explaining current waveforms in the case where current waveform control is performed.

As indicated by solid lines in FIG. 9, when the normal excitation control is performed, the current waveform of each phase has the same shape. In FIG. 9, the current waveforms in the pole configuration pattern of NSNSNS are illustrated.

Under the current waveform control, the excitation conditions of each phase are shifted into conditions that are different from the excitation conditions of the other phases, and the coils 12 of the three phases are controlled into an excited state in which the current waveforms of the respective phases have different shapes.

For example, phase-A (phase-U) excitation conditions are the same as the excitation conditions of the normal excitation control, and the excitation start angle and excitation end angle as phase-B (phase-V) excitation conditions are shifted by "−1°" from those of the normal excitation conditions, while the excitation start angle and excitation end angle as phase-C (phase-W) excitation conditions are shifted by "+1°" from those of the normal excitation conditions.

Thus, in the phase of which the current waveform is controlled to have a different shape from those of the other phases under the current waveform control, the excitation start angle deviates from the excitation start angle of the same phase used under the normal excitation control, and the excitation end angle deviates from the excitation end angle of the same phase used under the normal excitation control. Also, the amount of shift regarding the excitation start angle and the amount of shift regarding the excitation end angle may be set to a fixed value, and the excitation conditions (excitation start angle, excitation end angle) may be shifted by an amount corresponding to the fixed angle from the normal excitation conditions.

As indicated by broken lines in FIG. 9, when the current waveform control is performed, the current waveforms of the three phases have different shapes. Thus, the current waveform differs among the respective phases, and unbalanced current waveforms are produced by the three phases as a whole. In this case, the excitation width may be equal for each phase, but the current waveform (excited state) of at least one of the three phases has a different shape (state) from the current waveform(s) (excited state(s)) of the other phase(s), and unbalanced current waveforms are formed by the three phases as a whole. When the current waveforms of the respective phases are unbalanced, the vibratory forces of the respective phases come to different states. Therefore, an order component at a specific order can be weakened.

Also, when the pole configuration pattern is NSNSNS, the coils 12 are controlled into a two-phase excited state in which the current waveforms of adjacent two phases intersect with each other, as shown in FIG. 9. The two-phase excitation refers to an excited state in which the excitation widths in the current waveforms of the adjacent two phases overlap with each other. Although the current value steeply changes between zero and the maximum current value in single-phase excitation, change of the current value is gentler or slower in two-phase excitation than that in single-phase excitation, since the excitation width of the two-phase excitation is larger than that of the single-phase excitation. The single-phase excitation refers to an excited state in which the current waveform of each phase does not overlap that of another phase.

Figure 10:
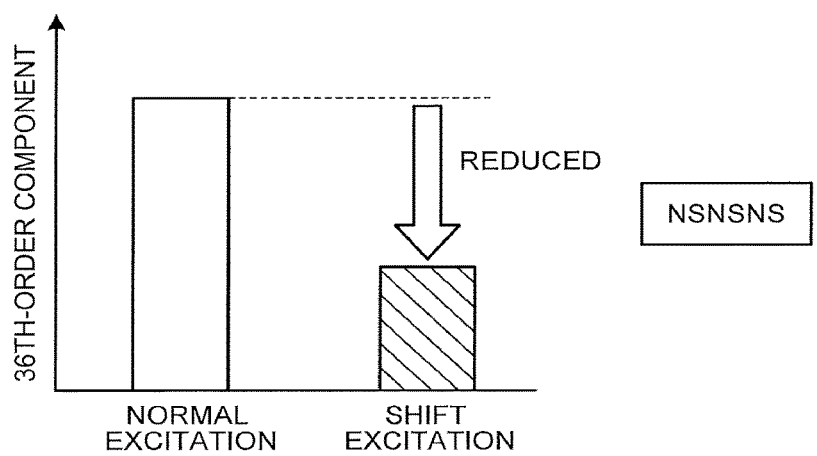
FIG. 10 is a view useful for explaining the effect to reduce a 36th-order component under the current waveform control.

Referring to FIG. 10, the effect to reduce the 36th-order component will be described. FIG. 10 indicates the 36th-order component (radial force) in the case where the normal excitation control was performed, and the 36th-order component (radial force) in the case where the current waveform control was performed, during driving in the NSNSNS pole configuration pattern.

It is understood from FIG. 10 that the component of the specific order can be reduced when the current waveform control is performed, as compared with that in the case where the normal excitation is performed. The effect to reduce the vibration and noise can be explained using differences between the current waveforms in the case where the coils 12 are excited under the normal excitation conditions, and the current waveforms in the case where the coils 12 are excited under excitation conditions different from the normal excitation conditions.

Figure 11:
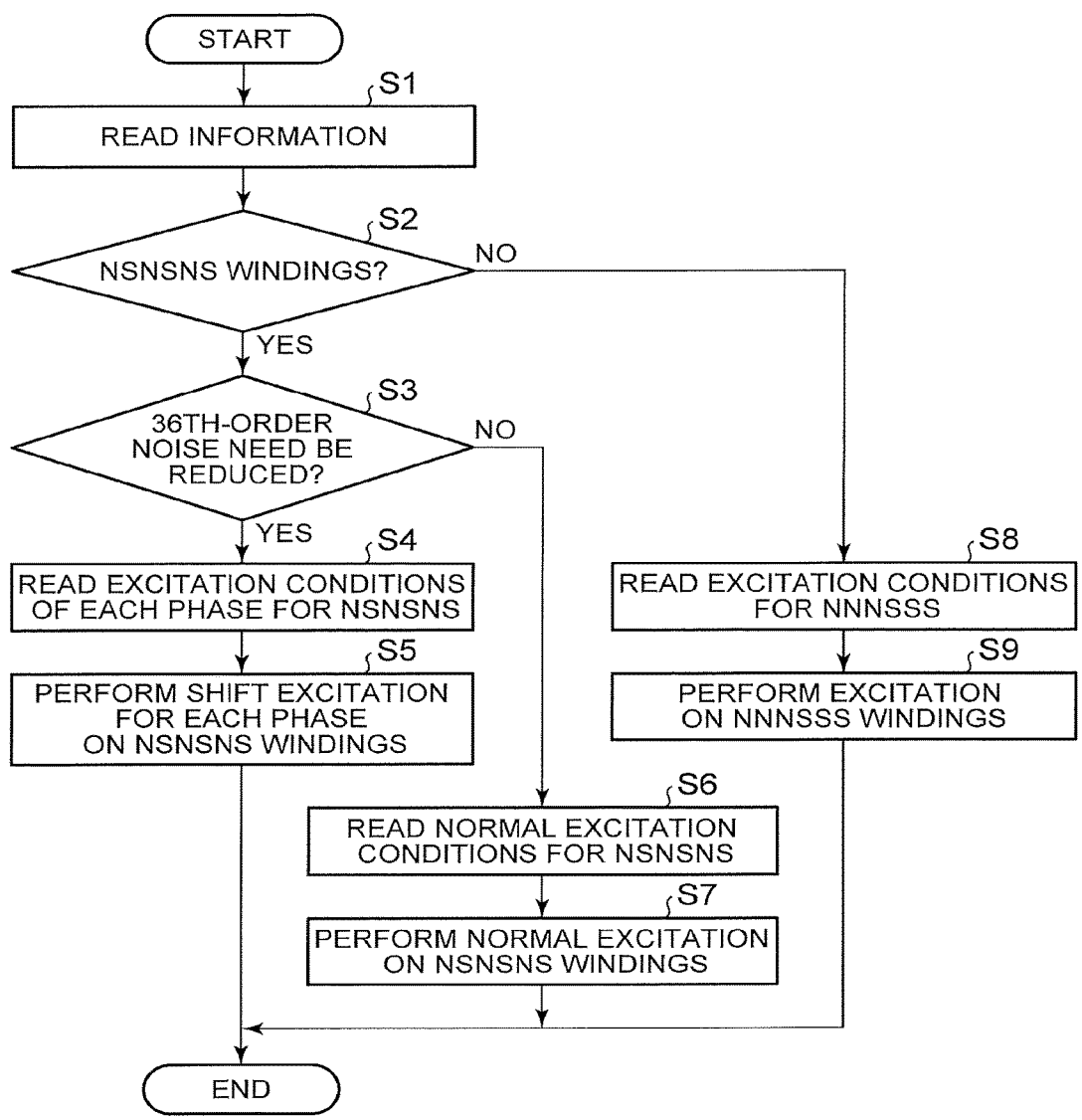
FIG. 11 is a flowchart showing one example of noise reduction control flow.

FIG. 11 is a flowchart illustrating one example of noise reduction control flow. The control flow shown in FIG. 11 is executed by the electronic control unit 100.

Initially, the electronic control unit 100 reads various kinds of information used for excitation control (step S1). The various kinds of information includes information on the current pole configuration pattern (information on the winding pattern), current value and voltage of each phase, motor speed, phase (electric angle), and motor command torque. In step S1, the motor speed may be calculated based on a resolver signal, and a motor torque command may be calculated as required toque of the SR motor 1.

After executing step S1, the electronic control unit 100 determines whether the current pole configuration pattern is "NSNSNS", based on the information read in step S1 (step S2).

If an affirmative decision (YES) is obtained in step S2 (step S2: YES), the electronic control unit 100 determines whether 36th-order noise needs to be reduced (step S3). In step S3, the electronic control unit 100 determines whether the excitation sound frequency of the 36th order (specific order) coincides with the resonance frequency. In step S3, the electronic control unit 100 may determine whether the 36th-order excitation sound frequency is included in the resonance region, based on the motor speed read in step S1.

If an affirmative decision (YES) is obtained in step S3 (step S3: YES), the electronic control unit 100 reads excitation conditions set to different conditions for respective phases, as excitation conditions for NSNSNS (step S4). In step S4, excitation conditions for current waveform control (for noise reduction control) are read.

After executing step S4, the electronic control unit 100 performs "shift excitation" where the excited states are different among the respective phases, in a condition where the pole configuration pattern is NSNSNS (step S5). In step S5, the current waveform control (noise reduction control) as described above is performed.

Namely, the excitation control of step S5 is performed, so that the coils 12 are brought into excited states based on different excitation conditions for respective phases. After step S5 is executed, this control routine ends.

On the other hand, if a negative decision (NO) is obtained in step S3 (step S3: NO), the electronic control unit 100 reads normal excitation conditions that realize the same current waveform in the three phases.

After executing step S6, the electronic control unit 100 performs normal excitation control based on the normal excitation conditions for NSNSNS read in step S6, in a condition where the pole configuration pattern is NSNSNS (step S7). With the normal excitation control of step S7 thus performed, normal excitation is performed so that the coils 12 of the three phases are brought into the same excited state. After step S7 is executed, this control routine ends.

If a negative decision (NO) is obtained in step S2 (step S2: NO), the electronic control unit 100 reads excitation conditions for NNNSSS (step S8). For example, the excitation conditions for NNNSSS are the same excitation conditions in the three phases.

After executing step S8, the electronic control unit 100 performs excitation control based on the excitation conditions for NNNSSS read in step S8, in a condition where the pole configuration pattern is NNNSSS (step S9). After step S9 is executed, this control routine ends.

As described above, according to the first embodiment, occurrence of resonance at a specific order is taken into consideration; therefore, when the SR motor 1 is driven in the NSNSNS pole configuration pattern, vibration and noise at the specific order can be reduced. More specifically, as the specific order, the least common multiple of the number of stator poles and the number of rotor poles, or an integral multiple of the product of the number of rotor poles and the number of coil phases is used. Then, when the pole configuration pattern is NSNSNS, excitation control is performed based on excitation conditions that are different for the respective phases, from the relationship between the excitation sound frequency at the specific order and the resonance frequency, so that the vibration and the noise can be reduced.

In the current waveform control as the noise reduction control, the excitation conditions are changed while the NSNSNS windings are maintained; thus, it is not necessary to switch the winding patterns so as to reduce vibration and noise. Thus, since no switching is needed in the inverter circuit when the current waveform control is performed, a switching loss is prevented from arising in switches for switching the pole configuration pattern.

Further, in the "shift excitation" under the current waveform control, the coils 12 are controlled into the two-phase excited state in which the excitation zones of adjacent two phases overlap with each other. As a result, the vibratory force (radial force) of the specific order can be reduced. Since the excitation zone of each phase overlaps with that of another phase in the two-phase excited state, the current changes slowly or at a low rate, and the amplitude of the vibratory force (radial force) can be reduced. Therefore, it is possible to reduce the vibration and the noise, while assuring a high efficiency at the same time.

In the first embodiment, the winding pattern of the coils 12 can be switched during driving of the SR motor 1. Therefore, the winding pattern can be switched to the optimum winding pattern that is optimum in terms of the efficiency, and vibration and noise, according to the drive state of the SR motor 1.

In step S2 shown in FIG. 11, a pole configuration pattern that is appropriate in terms of the efficiency, and vibration and noise may be determined based on the information read in step S1. Namely, when the current pole configuration pattern is "NNNSSS", it may be determined in step S2 whether the pole configuration pattern is to be switched from "NNNSSS" to "NSNSNS". Then, if an affirmative decision (YES) is obtained in step S2, control for switching of the winding pattern may be executed, so that the pole configuration pattern is switched from "NNNSSS" to "NSNSNS", and step S3 through step S7 subsequent to step S2 may be executed.

In step S3, it may be determined whether the 36th-order vibratory force (radial force) is larger than a predetermined threshold value. Namely, the electronic control unit 100 is only required to determine in step S3 whether the 36th-order vibratory force (radial force) is large.

Figure 12:
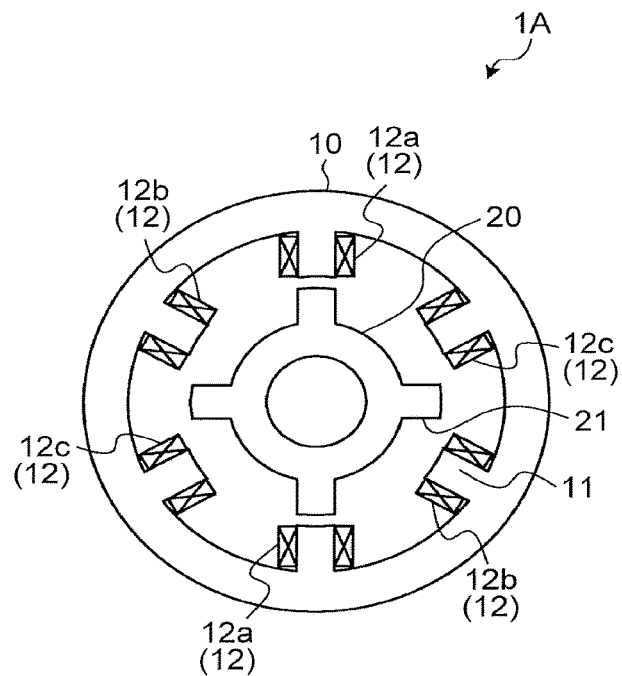
FIG. 12 is a view schematically showing a constructive example of a switched reluctance motor according to a modified example of the first embodiment.

As a modified example of the first embodiment, as shown in FIG. 12, an SR motor 1A may be configured such that the number of stator poles is "6", and the number of rotor poles is "4". Thus, the SR motor to be controlled by the control system is not limited to the SR motor 1 in which the number of stator poles is "18", and the number of rotor poles is "12", as shown in FIG. 2.

In the SR motor 1A shown in FIG. 12, the least common multiple of the number of stator poles and the number of rotor poles is "12". Therefore, the specific order is "12th order".

Further, in the SR motor 1A, an integral multiple of the product of the number of rotor poles and the number of coil phases is "12" or "24". Therefore, the specific order is "12th order" or "24th order".

When the SR motor 1A is an object to be controlled, noise is reduced when resonance occurs at the 12th-order excitation sound frequency and the 24th-order excitation sound frequency. As shown in FIG. 6 described above, resonance is more likely to occur as the motor speed changes, and the 12th-order frequency and the 24th-order frequency come closer to the resonance frequency (resonance component). Then, when the 12th-order frequency or the 24th-order frequency coincides with the resonance frequency, the largest resonance occurs, and particularly large vibration and noise are generated. Further, as shown in FIG. 6, the motor speed at which the 12th-order frequency coincides with the resonance frequency is higher than the motor speed at which the 24th-order frequency coincides with the resonance frequency. Namely, the noise (excitation sound) of the 12th-order component is generated in a higher rotational speed region than the noise of the 24th-order component. Also, when the motor speed is equal, the 12th-order frequency lies within a lower frequency range than the 24th-order frequency.

Thus, the 12th-order or 24th-order frequency coincides with the resonance component (resonance frequency) when the motor speed is in a higher speed region, as compared with the 36th-order frequency. Therefore, in the current waveform control performed on the SR motor 1A, vibration and noise in a high speed region are reduced. Where the noise reduction control flow as described above is applied to the SR motor 1A, it is determined in step S3 shown in FIG. 11 whether the 12th-order (or 24th-order) noise needs to be reduced.

As a modified example of the first embodiment, excitation conditions used for the current waveform control may be determined to be variable values, rather than fixed values. The control system can perform excitation condition setting control for setting a shift amount (difference in angle) about the excitation start angle, and a shift amount (difference in angle) about the excitation end angle.

More specifically, when the current waveform of a certain phase is shaped differently from that of another phase, the excitation conditions used for the current waveform control may be shifted from normal excitation conditions, by an amount or angle determined by any given angle. The given angle is a value within a predetermined angular range. The angular range is narrower as the number of rotor poles is larger. Namely, the angular range in the case where the number of rotor poles is as large as "12" as in the SR motor 1 shown in FIG. 2 is narrower than the angular range in the case where the number of rotor poles is as small as "4". Namely, the upper limit of the angular range is a larger value as the number of rotor poles is smaller, and the upper limit is a smaller value as the number of rotor poles is larger. The angular range is a range of an electric angle, and its lower limit is a negative value, while the upper limit is a positive value.

For example, since the SR motor 1 shown in FIG. 2 has the larger number of motor poles (the larger number of rotor poles) than the SR motor 1A shown in FIG. 12, the upper limit of the angular range for the SR motor 1 is set to a smaller electric angle than that for the SR motor 1A. As one example, in the SR motor 1, any given angle is selected as a shift amount within the angular range of "−1° to +1°". In the SR motor 1A, any given angle is selected as a shift amount within the angular range of "−5° to +5°".

Then, in the SR motor 1, the shift amount of phase A is "0°", and the shift amount of phase B is "a negative value equal to or higher than −1° as the lower limit", while the shift amount of phase C is "a positive value equal to or lower than +1° as the upper limit".

On the other hand, in the SR motor 1A, the shift amount of phase A is "0°", and the shift amount of phase B is "a negative value equal to or higher than −5° as the lower limit", while the shift amount of phase C is "a positive value equal to or lower than +5° as the upper limit".

According to this modified example, the range of application to SR motors is expanded. Further, since the shift amount is determined by the given angle, the vibratory force of each phase changes randomly; therefore, the order component at a specific order is dispersed, and the frequency is less likely or unlikely to be matched, so that vibration and noise can be reduced.

In addition, even when the SR motor 1 as shown in FIG. 2 is an object to be controlled, the 12th-order and 24th-order components, as well as the 36th-order component, can be reduced. Namely, when the SR motor 1 is driven with the NSNSNS windings, the 36th-order noise and vibration can be reduced, and the 12th-order and 24th-order vibration and noise can also be reduced.

When both of the excitation start angle and excitation end angle in the same phase are shifted, the amount of shift regarding the excitation start angle and the amount of shift regarding the excitation end angle may be set to different values. For example, in the setting method using any given angle selected within the angular range of "−1° to +1°" with respect to the SR motor 1 as described above, the amount of shift of the excitation start angle may be set to "+1°", and the amount of shift of the excitation end angle may be set to "+0.7°", with respect to phase C. In this manner, current waveforms having a wide variety of shapes can be realized, as compared with the current waveform control (noise reduction control) in the case where the amounts of shift of the excitation start angle and the excitation end angle are set to the same value. Therefore, the current waveforms of the three phases, which are more unbalanced as a whole, can be provided.

Further, the disclosure is not limited to the case where both the excitation start angle and the excitation end angle are shifted, but at least one of the excitation start angle and the excitation end angle may be set to be shifted. Namely, when the current waveform control is performed, in a phase of which the current waveform has a different shape from those of the other phases, it is only required to satisfy at least one of the following conditions that the excitation start angle deviates from that of the same phase used in normal excitation control, and that the excitation end angle deviates from that of the same phase used in normal excitation control.

For example, in the setting method using any given angle selected within the angular range of "−1° to +1°" with respect to the SR motor 1 as described above, the excitation start angle may not be shifted, and only the excitation end angle may be set to "+0.7°", with respect to phase C. Thus, the method of changing only one of the excitation start angle and excitation end angle included in the excitation conditions is not limitedly applied to the setting method (where a variable value is used) of the modified example using any given angle (random number), but may also be applied to the setting method (where a fixed value is used) of the first embodiment.

The current waveform control may be performed on the current waveforms of all of phase A, phase B, and phase C so that the current waveform of each phase has a different shape from those of the other phases. Therefore, for example, both of the excitation start angle and the excitation end angle may be shifted by the same value in phase A, and only the excitation start angle may be shifted in phase B, while the excitation start angle and the excitation end angle may be shifted by different values in phase C. In sum, the control system can individually control the respective phases, by combining the excitation condition setting controls as described above.

The inverter 2 may include switching circuits for switching of the pole configuration pattern in two or more phases. For example, an inverter 2A shown in FIG. 13 is a circuit having switching circuits in two phases, and an inverter 2B shown in FIG. 14 is a circuit having switching circuits in three phases, namely, in respective phases.

Figure 13:
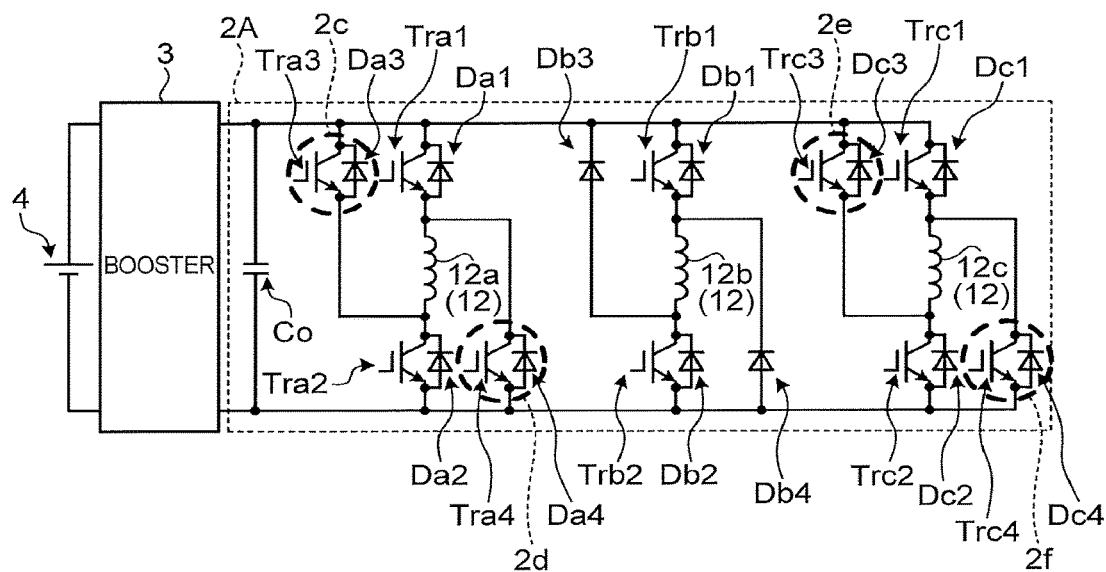
FIG. 13 is a circuit diagram showing one example of an inverter circuit according to a modified example of the first embodiment.

As shown in FIG. 13, in the inverter 2A, a phase-A circuit includes a switching unit 2c in which a transistor Tra3 is added to the diode Da3, and a switching unit 2d in which a transistor Tra4 is added to the diode Da4. Further, a phase-C circuit includes a switching unit 2e in which a transistor Trc3 is added to the diode Dc3, and a switching unit 2f in which a transistor Trc4 is added to the diode Dc4. In the phase B of the inverter 2A, the switching units 2a, 2b as described above are not provided. Thus, if the phase B switches the middle of NNN and NSN when switching between the NNNSSS windings and the NSNSNS windings, the inverter circuit in which the switches are added to the phase A and the phase C can be used so as to switch the opposite ends of NNN and NSN.

Figure 14:
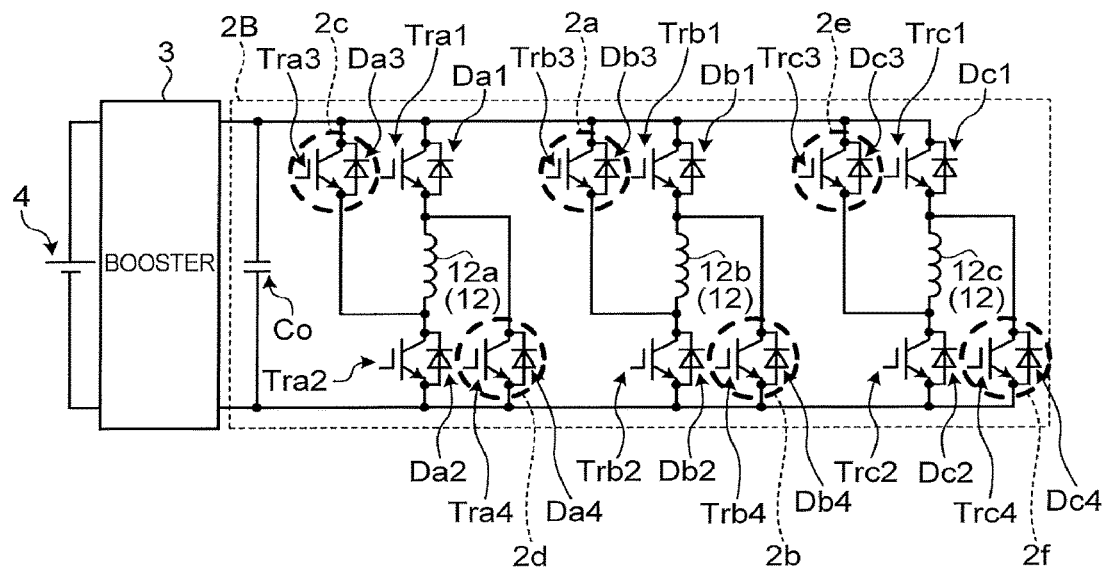
FIG. 14 is a circuit diagram showing another example of an inverter circuit according to a modified example of the first embodiment.

As shown in FIG. 14, in the inverter 2B, the phase-A circuit includes two switching units 2c, 2d, and the phase-B circuit includes two switching units 2a, 2b, while the phase-C circuit includes two switching units 2e, 2f.

Thus, according to the examples of inverter circuits each having switching units in two or more phases, the control system can disperse the load of the inverter 2A, 2B produced by frequently switching the winding pattern, by causing the two or more switching circuits to undertake switching operation.

The above-described various modified examples may be combined as appropriate. For example, in the system configuration in which the inverter 2A shown in FIG. 13 is connected to the SR motor 1A shown in FIG. 12, it is possible to set excitation conditions using any given angle selected within a predetermined angular range, for example.

Figure 15:
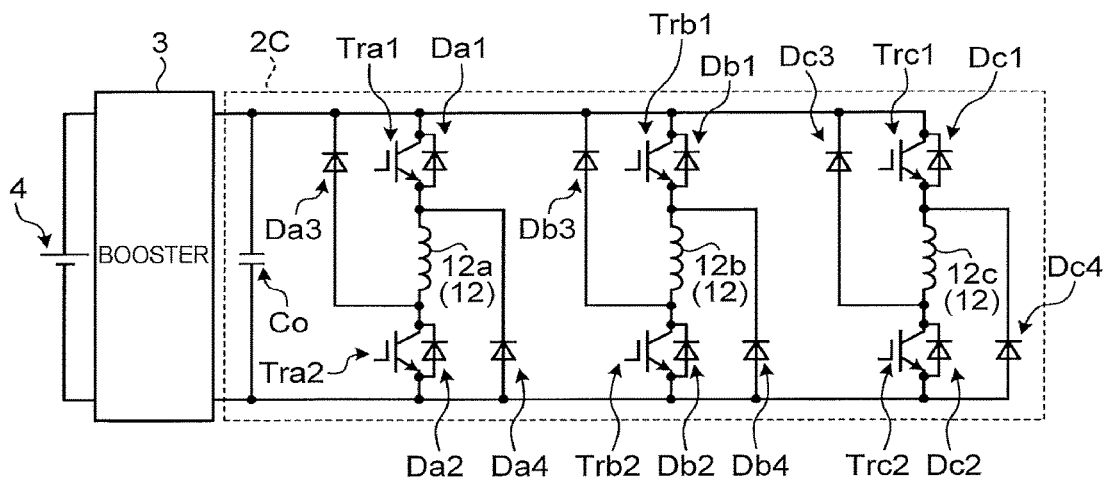
FIG. 15 is a circuit diagram showing an example of an inverter circuit according to a second embodiment.

Referring next to FIG. 15, a control system of a second embodiment will be described. The second embodiment is different from the first embodiment in that an SR motor 1 of which the winding pattern cannot be switched is an object to be controlled. In the description of the second embodiment, the same or similar configurations as those of the first embodiment will not be described, and the reference numerals used in the first embodiment will be referred to.

Initially, the winding pattern of the second embodiment is only the second winding pattern (NSNSNS windings) that provides "the pole configuration pattern of NSNSNS" (see FIG. 5). Therefore, as shown in FIG. 15, no switching unit for switching of the pole configuration pattern is provided in an inverter 2C of the second embodiment.

More specifically, in the inverter 2C of the second embodiment, a phase-A circuit includes two transistors Tra1, Tra2, and four diodes Da1, Da2, Da3, Da4, and a phase-B circuit includes two transistors Trb1, Trb2, and four diodes Db1, Db2, Db3, Db4, while a phase-C circuit incudes two transistors Trc1, Trc2, and four diodes Dc1, Dc2, Dc3, Dc4.

The current waveform control of the second embodiment can be performed according to the control flow shown in FIG. 11 as described above. In the second embodiment, step S2, step S8, and step S9 shown in FIG. 11 are eliminated. More specifically, after execution of step S1, the electronic control unit 100 proceeds to step S3. In the second embodiment, step S3 through step S7 subsequent to step S1 are executed in the same manner as those in the first embodiment. Thus, the control system of the second embodiment does not perform switching control of the pole configuration pattern, but performs excitation control (normal excitation control and current waveform control).

As described above, according to the second embodiment, even in the SR motor 1 in which the pole configuration pattern is not switched, vibration and noise at a specific order can be reduced.

Also, according to the second embodiment, there is no need to provide a switching unit for switching the pole configuration pattern, resulting in reduction of the cost. Further, a switching loss due to the switching unit is prevented from being generated, and therefore, the efficiency is improved.

The modified examples of the first embodiment can be applied to the second embodiment. Namely, the above-described various modified examples (or combinations thereof) can be applied to the second embodiment.

Here, an example of a vehicle to which the above-described embodiments and modified examples can be applied will be described. The control system as described above can be applied to various types of vehicles.

Figure 16:
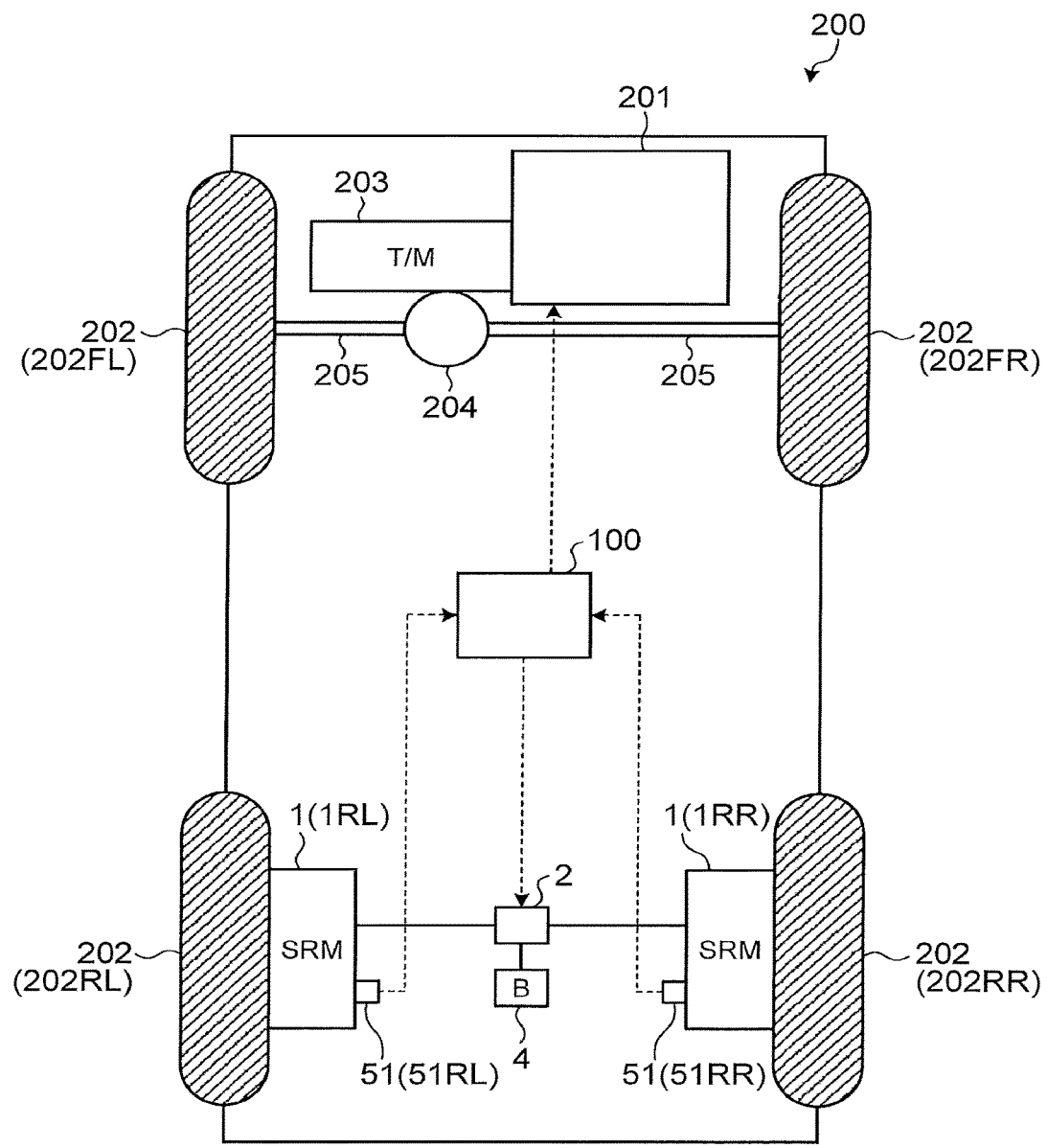
FIG. 16 is a skeleton diagram showing one example of a vehicle to which the disclosure is applied.

FIG. 16 is a skeleton diagram showing one example of a vehicle to which the above embodiments and modified examples can be applied. The vehicle 200 shown in FIG. 16 includes an engine 201, wheels 202, transmission (T/M) 203, differential gear 204, drive shaft 205, and SR motors (SRM) 1 as power sources for traveling. The vehicle 200 is a four-wheel-drive vehicle, and the engine 201 drives right and left front wheels 202FR, 202FL, while the SR motors 1 as rear motors drive right and left rear wheels 202RR, 202RL.

The SR motor 1 is a so-called in-wheel motor, and one SR motor 1 is provided for each of the right and left rear wheels 202RR, 202RL. In the rear-side drive system of the vehicle 200, a left rear SR motor 1RL is connected to the left rear wheel 202RL, and a right rear SR motor 1RR is connected to the right rear wheel 202RR. The rear wheels 202RL, 202RR can rotate independently of each other.

The left rear wheel 202RL is driven with output torque (motor torque) of the left rear SR motor 1RL. Also, the right rear wheel 202RR is driven with output torque (motor torque) of the right rear SR motor 1RR.

The left rear SR motor 1RL and the right rear SR motor 1RR are connected to the battery (B) 4 via the inverter 2. The left rear SR motor 1RL and the right rear SR motor 1RR function as electric motors using electric power supplied from the battery 4, and also function as generators that convert torque (external force) transmitted from the right and left rear wheels 202RR, 202RL into electric power. The inverter 2 includes an electric circuit for the left rear SR motor 1RL, and an electric circuit for the right rear SR motor 1RR.

The electronic control unit 100 controls the left rear SR motor 1RL and the right rear SR motor 1RR, and the engine 201. For example, the electronic control unit 100 includes a controller for the SR motors (ECU for the SR motors), and a controller for the engine (engine ECU). In this case, the engine ECU performs engine torque control for adjusting output torque of the engine 201 to a target torque value, through intake air control, fuel injection control, ignition control, and so forth. The ECU for the SR motors performs motor control on the left rear SR motor 1RL and the right rear SR motor 1RR, based on signals received from rotational speed sensors 51. The rotational speed sensors 51 include a left rear rotational speed sensor 51RL that detects the rotational speed of the left rear SR motor 1RL, and a right rear rotational sensor 51RR that detects the rotational speed of the right rear SR motor 1RR.

The vehicle in which the electronic control unit 100 can be used is not limited to the application example (first application example) as described above. For example, the electronic control unit 100 may be used in a vehicle in which the SR motors 1 are provided for all of the wheels 202 (second application example), unlike the first application example. Also, unlike the first application example, the electronic control unit 100 may be used in a rear-wheel-drive vehicle in which a front-side drive system is not provided.

In another application example of the electronic control unit 100, the power source for traveling of the vehicle 200 consists solely of the SR motors 1 in the form of in-wheel motors (fourth application example), unlike the first through third application examples. Also, unlike the fourth application example, the SR motors 1 may not be in the form of in-wheel motors (fifth application example).

In a further application example of the electronic control unit 100, unlike the fifth application example, the configuration of the first application example may be installed as a front-side drive system (sixth application example). Also, the rear-side drive system may not be provided, unlike the third application example, or the drive systems may be located at opposite positions in the longitudinal direction, unlike the fourth application example (seventh application example).

The present disclosure is not limited to the embodiments and modified examples as described above, and the embodiments, etc. may be modified or changed as needed without departing from the object of the disclosure. For example, a step-down unit (step-down converter) for stepping down or lowering the voltage applied to the SR motor 1 may be provided, in place of the booster 3 as described above.

What is claimed is:
1. A switched reluctance motor system comprising:
a switched reluctance motor;
a rotor including a plurality of salient poles;
a stator including a plurality of salient poles;
coils of three phases wound around the salient poles of the stator; and
an electronic control unit configured to drive the switched reluctance motor in a pole configuration pattern in which the salient poles of the stator that have different polarities are alternately arranged,
the electronic control unit being configured to perform current waveform control when an excitation sound frequency of a given order coincides with a resonance frequency of the switched reluctance motor, the given order being at least one of an order that is a least common multiple of the number of the salient poles of the stator and the number of salient poles of the rotor, and an order that is an integral multiple of a product of the number of the salient poles of the rotor and the number of phases of the coils, the current waveform control being a control that controls current waveforms produced when current is passed through the coils of the three phases, such that a current waveform in the coils of at least one phase has a different shape from a current waveform in the coils of another phase.

2. The switched reluctance motor system according to claim 1, wherein:
excitation conditions as conditions under which the current is passed through the coils of the three phases include an excitation start angle and an excitation end angle;
the electronic control unit is configured to perform a selected one of first excitation control and the current waveform control, the first excitation control is a control that control excitation of the coils such that the current waveforms in the coils of the three phases have the same shape, according to a drive state of the switched reluctance motor; and
at least one of a condition and a condition below is satisfied, in the at least one phase of which the current waveform has a different shape from that of the other phase, when the electronic control unit performs the current waveform control,
(i) the excitation start angle is shifted from the excitation start angle of the same phase used under the first excitation control, and
(ii) the excitation end angle is shifted from the excitation end angle of the same phase used under the first excitation control.

3. The switched reluctance motor system according to claim 2, wherein
the electronic control unit is configured to perform excitation condition setting control, the excitation condition setting control is a control that select and set a first shift amount and a second shift amount from within a given angular range, the first shift amount being a shift amount by which the excitation start angle used under the current waveform control is shifted from the excitation start angle of the same phase used under the first excitation control, the second shift amount being a shift amount by which the excitation end angle used under the current waveform control is shifted from the excitation end angle of the same phase used under the first excitation control.

4. The switched reluctance motor system according to claim 3, wherein
the given angular range is narrower as the number of the salient poles of the rotor is larger.

5. The switched reluctance motor system according to claim 3, wherein
the electronic control unit is configured to set the first shift amount and a second shift amount to different values when both the excitation start angle and the excitation end angle of the at least one phase are shifted from those of the excitation conditions of the same phase used under the first excitation control.

6. The switched reluctance motor system according to claim 1, wherein
the current waveform control includes second excitation control for controlling the coils into a two-phase excited state in which current waveforms of adjacent two phases intersect with each other.

7. The switched reluctance motor system according to claim 1, further comprising
a switching circuit configured to switch a winding pattern of the coils of the three phases between a first winding pattern and a second winding pattern, the first winding pattern being a pole configuration pattern in which the coils of the three phases are wound in the same direction, the second winding pattern being the pole configuration pattern in which the salient poles of the stator that have different polarities are alternately arranged.

8. A method of controlling a switched reluctance motor system,
the switched reluctance motor system including a rotor including a plurality of salient poles, a stator including a plurality of salient poles, coils of three phases wound around the salient poles of the stator, and an electronic control unit configured to drive the switched reluctance motor in a pole configuration pattern in which the salient poles of the stator that have different polarities are alternately arranged,
the method comprising
performing, by the electronic control unit, current waveform control when an excitation sound frequency of a given order coincides with a resonance frequency of the switched reluctance motor,
the given order being at least one of an order that is a least common multiple of the number of the salient poles of the stator and the number of salient poles of the rotor, and an order that is an integral multiple of a product of the number of the salient poles of the rotor and the number of phases of the coils,
the current waveform control being a control that controls current waveforms produced when current is passed through the coils of the three phases, such that a current waveform in the coils of at least one phase has a different shape from a current waveform in the coils of another phase.

* * * * *

UNITED STATES PATENT AND TRADEMARK OFFICE
CERTIFICATE OF CORRECTION

PATENT NO. : 10,483,897 B2
APPLICATION NO. : 15/957273
DATED : November 19, 2019
INVENTOR(S) : Junichi Deguchi et al.

Page 1 of 1

It is certified that error appears in the above-identified patent and that said Letters Patent is hereby corrected as shown below:

On the Title Page

Item (73), the first Assignee name is incorrect. Item (73) should read:
-- (73) Assignees: TOYOTA JIDOSHA KABUSHIKI KAISHA, Toyota-shi (JP);
 Tokyo University of Science Foundation, Shinjuku-ku (JP) --

Signed and Sealed this
Second Day of June, 2020

Andrei Iancu
*Director of the United States Patent and Trademark Office*